Figure 1:
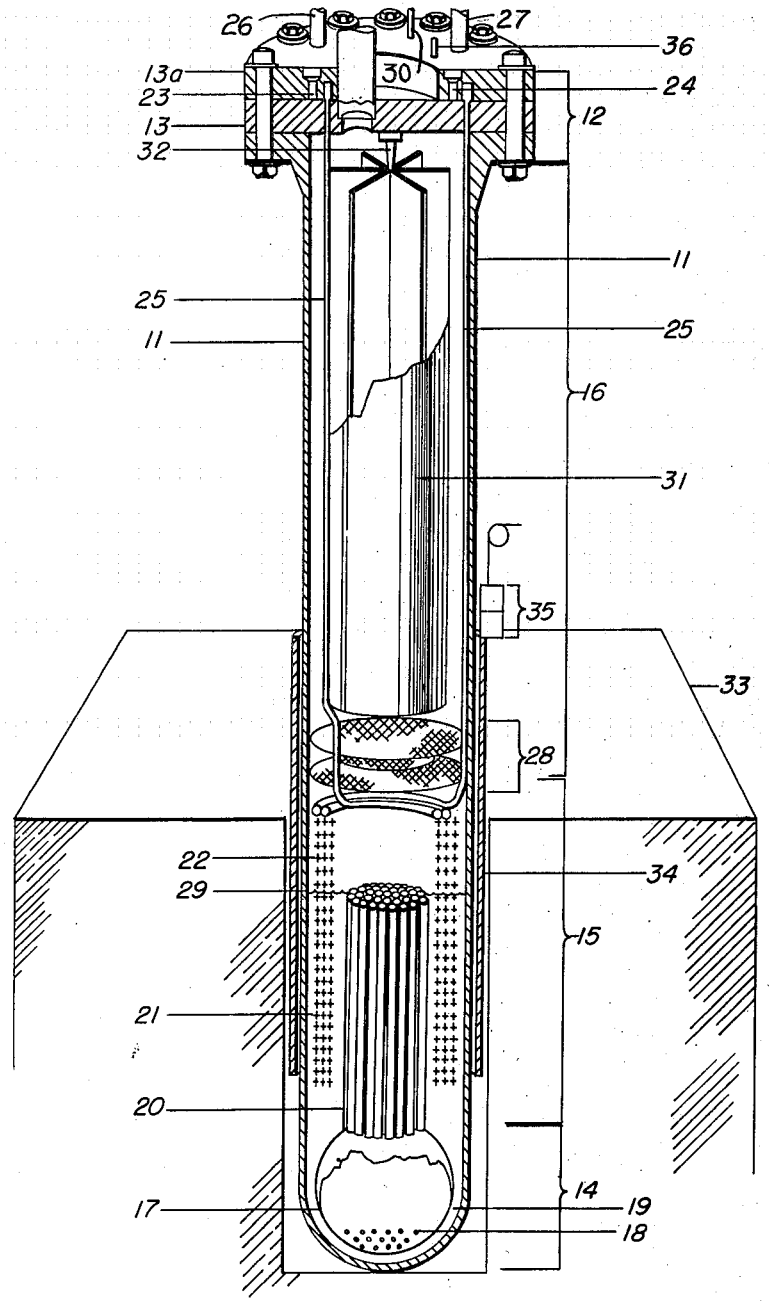

June 3, 1958 H. M. BUSEY 2,837,476
STEAM STIRRED HOMOGENEOUS NUCLEAR REACTOR
Filed Jan. 27, 1956 2 Sheets-Sheet 2

WITNESSES
*Ralph Carlisle Smith*

INVENTOR.
Harold M. Busey
BY
*Roland A. Anderson*
*attorney*

United States Patent Office 2,837,476
Patented June 3, 1958

2,837,476

STEAM STIRRED HOMOGENEOUS NUCLEAR REACTOR

Harold M. Busey, Los Alamos, N. Mex., assignor to the United States of America as represented by the United States Atomic Energy Commission Application January 27, 1956, Serial No. 561,961

5 Claims. (Cl. 204—193.2)

The present invention relates to nuclear reactors and more particularly to homogeneous nuclear reactors utilizing a liquid fuel.

The nuclear reactor of the present invention is an improved reactor of the homogeneous type, and is described as particularly suitable for use as a research device where a maintenance free reactor of moderately high neutron flux is desired.

Homogeneous reactors of the prior art generally require extensive fuel handling and gas recombining systems. Also, in the prior art reactors, extensive fuel circulating apparatus is required or such reactors are drastically restricted to low power levels because of reliance on convection circulation. No such restrictions are required in the present invention, since convection circulation is materially aided by the design and operating temperature of the system.

Although the description of the preferred embodiment is specific to a power level of the order of 100 kilowatts at which the central neutron flux is about $10^{12}$ neutrons per square cm. per sec. using ordinary water as a moderator, an appropriate scale-up of the reactor of the present invention could operate in the megawatt region for heat or power generation. The modifications required would include a larger critical region, heat exchanging capacity, and volume of fuel.

The preferred embodiment of the present invention provides for the removal of heat from the critical region by utilizing the steam bubbles formed in the critical region. The critical region has a plurality of upwardly extending small diameter tubes. The liquid fuel is directed up these tubes and down the adjacent annular area containing heat exchanging apparatus and back into the critical region. It is the relation of the length and diameter of these tubes which distinguishes the present invention from the circulating systems of the prior art.

Further, in the present invention the liquid-gas interface is not within the critical region, i. e. not within the geometry which determines the critical mass. Therefore, disturbances on the liquid surface will have a reduced effect upon the power and neutron level.

The reactor of the present invention is primarily controlled by its negative temperature coefficient of reactivity and the power level may be adjusted by regulating the flow of cooling fluid. For a steady neutron flux, a constant rate of flow will be required. However, conventional control rods may be used if desired.

Therefore, it is an object of the present invention to provide a homogeneous nuclear reactor which is relatively inexpensive to build, safe to operate, compact in arrangement and which has an improved liquid fuel circulating system.

Another object of the present invention is to provide a homogeneous nuclear reactor which utilizes the bubbles formed in the liquid fuel to circulate the liquid fuel through a heat exchanger.

A further object of the present invention is to provide a method and apparatus for circulating the liquid fuel of a homogeneous reactor in a simple and rapid manner without the use of complicated circulating apparatus.

A still further obect of the present invention is to provide a method and apparatus for circulating the liquid fuel of a homogeneous reactor which results in a highly stable neutron flux level.

Figure 2:
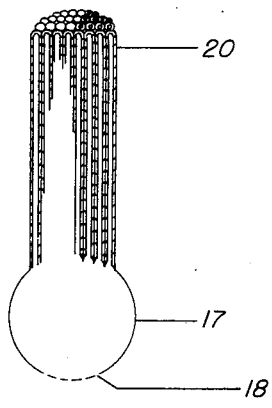
Figure 3:
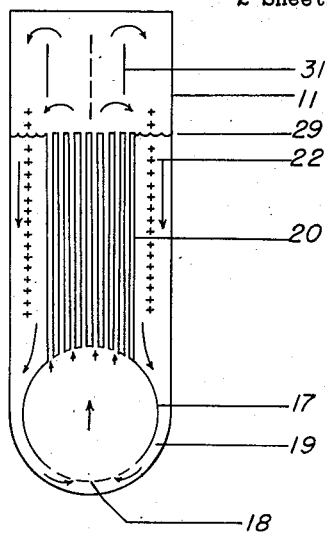
Figure 4:
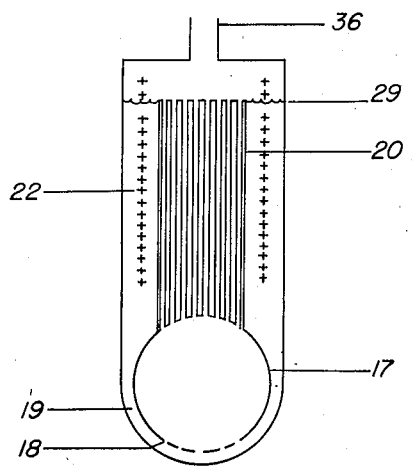

Other objects and advantages of the present invention will become more apparent from the following description including drawings, hereby made a part of the specification, wherein:

Figure 1 is a sectional view of one embodiment of the present invention showing the internal components thereof, Figure 2 is a detailed sectional view of the reaction shell and associated circulating tubes, Figure 3 is a schematic diagram of the circulating system, and Figure 4 is a schematic diagram of one modification of the present invention.

APPARATUS

The preferred embodiment of the present invention shown in Figure 1 comprises a closed reactor vessel 11, preferably fabricated from stainless steel, having a flanged top plate asembly 12. The top plate assembly 12 consists of the vessel flange, a central plate 13 and a manifold plate 13a. The central plate 13 is sealed to the flange of the reactor vessel 11 and contains appropriate coolant inlet channels and steam outlet channels connected, respectively, to a coolant supply and power producing facilities. The manifold 13a is sealed to the top of central plate 13.

The interior chamber of the vessel 11 of the preferred embodiment may be divided into three sections. The first section is the critical region 14 and is located near the bottom of the vessel 11. The second region is the heat exchanger and tube bundle region 15, and is located immediately above the critical region. The third region is the gas recombination region 16 which is located in the top of the vessel 11, i. e., above region 15. The critical region 14 of the vessel 11 in the preferred embodiment has a spherical reaction shell or baffle 17 fabrication from stainless steel having a thickness of about 0.1 inch. In this manner its effect upon critical dimension calculations is negligible. The lower portion of the reaction shell 17 is perforated as at 18 or otherwise partially open so that liquid fuel may enter. The reaction shell 17 is supported in any conventional manner in spaced relation to the bottom and the sides of vessel 11 thereby allowing liquid fuel to flow through the channel 19 so formed. Channel 19 has approximately the same cross sectional flow area as the total flow area of the tubes 20.

Extending upwardly from the critical region is a bundle of small diameter tubes 20 welded to the top portion of reaction shell 17. These tubes extend upwardly from the reaction shell 17 and connect the interior of the shell 17 with the upper portion of the heat exchanger region 15. The tubes 20 are spaced from the walls of vessel 11 thereby forming down-channel 21. The number of tubes required is dependent upon the circulation rate required. For example, in the specific embodiment being described about 100 of these tubes would be required for the desired power output and circulation rate. The tubes are welded or otherwise attached to each other in such a manner that the interstices between tubes are sealed from the liquid fuel. The length and diameter of these tubes are an important aspect of the present invention.

The length of each tube 20, see Figure 2, in the preferred embodiment is at least as long as the height of the critical region 17, so that the majority of the bubbles are formed in the tube rather than in the critical region. The diameter of the tube should be of the same order of magnitude as the diameter of the bubble upon reaching the upper portion of the tube. These relations result in a greater circulation rate than is possible by utilizing a single tube. The reason for the increased rate of circulation with a plurality of tubes is that the small diameter of the tubes approximates to a closer degree the average size of the bubble formed, so that a geyser effect takes place in each tube forcing the liquid fuel out the top of the tube as the bubble rises. Furthermore, with a plurality of tubes, bubble surges are random and have very little effect on the reactivity. With a single channel the presence of a series of bubbles produces a surge in circulation, and allows neutrons to escape more easily from the critical region, since the reflective influence of the bubbles is considerably lower than that of the liquid.

The length of the tubes is also important. The bubbles are originally formed as microscopic bubbles in the reaction shell 17. As these bubbles rise in the tubes, they coalesce to larger bubbles. The tubes must be long enough so that sufficient time is available for this coalescence to become appreciable in order that the geyser effect will function to circulate the liquid fuel. It has been found that optimum circulation is obtained, at an operating temperature of 100° C., if the tubes are at least as long as the height of the reaction region, although no appreciable adverse effect was found by reducing the length the order of a few centimeters less than the reaction regions height.

The diameter of the tubes has been found to be critical if maximum circulation is desired. For the specific instance of spherical reaction shell of about 25 cm. diameter, a tube length of about 25 cm. and an operating temperature of 100° C., the tube diameter which gives maximum efficiency in circulating the liquid fuel is about 1 cm. Further it has been found that this diameter is not dependent upon the diameter of the critical region.

If the diameter of the tubes in the particular embodiment being described is increased to greater than about 15 mm., or is reduced to less than about 8 mm., it has been found that an undesired effect on the circulation rate results. The tubes 20 are preferably thin walled stainless steel tubes of approximately equal length. In the preferred embodiment shown in Figure 1 no provision has been made for a central control rod. However, if such a rod is desired, several of the centrally located tubes may be removed and a sleeve (not shown) for the control rod inserted. Such a sleeve would extend upwardly through the gas recombining region and top plate assembly.

The heat exchanger 22 consists of a series of flat spaced coils of 3/16 inch O. D., 1/8 inch I. D. stainless steel tubing, the tube bundle having a generally cylindrical form. The heat exchanger 22 is manifolded in flange 13a, and is connected to annular coolant channels 23 and 24. The heat exchanger inlet and outlet pipes 25 are evenly distributed around the interior surface of the vessel 11, only two being shown for illustration purposes. Coolant inlet 26 and coolant outlet 27 are connected, respectively, to annular inlet channel 23 and annular outlet channel 24, which are located in the bottom surface of manifold plate 13a. The heat exchanger 22 is supported by the outlet and inlet pipes 25 which are attached to the top plate assembly 12, so that the entire fuel cooling apparatus may be removed with the top plate assembly 12.

Above the upper extremity of the heat exchanger 22 is a series of fine mesh screen baffles 28 for preventing splashing of the liquid fuel upwardly into the recombining region, and to act as an entrainment trap for droplets of fuel forced upwardly by the geyser action in the tubes 20.

The level 29 of the liquid fuel during operation is approximately equal to or slightly below the upper extremity of tubes. 20. The heat exchanger area located above the liquid level 29 functions to condense the steam and return it to the liquid fuel.

A liquid fuel inlet pipe 30 is provided which is sealed to the top plate assembly 12 and extends to the bottom of the interior of reactor 11. Through this inlet pipe, the liquid fuel is introduced into the reactor. The inlet pipe is connected through a control system (not shown) to a storage tank (not shown). Thus the fuel may be removed from the reactor and stored at a remote, shielded location, if maintenance of the reactor components is required. Inlet pipe 30 also provides a means for adding fissionable material, moderator, or other material to the liquid fuel, as this may be required after operating the reactor for some time.

The recombiner region, indicated generally at 31 and supported by bracket 32, and its arrangement is described in copending application Serial No. 493,579 by Harold M. Busey, filed March 10, 1955, entitled Method and Apparatus for Catalytically Combining Gases, the subject matter of which is incorporated herein by reference.

The reflector, shielding and thermal column construction and control apparatus are also not descirbed herein, since the size and type of such components are well known in the art.

The upper portion of the reactor vessel 11 may be enclosed in a coolant jacket, not shown, to aid the convection circulation in the gas recombining region and the cold leg of the fuel circulating region.

Between the vessel 11 and the reflector 33, a sleeve 34 is located which is fabricated from a neutron absorbing material, such as cadmium, boron or similar material. The sleeve 34 is movable parallel to the axis of the vessel 11 by manual or automatic means (not shown) and is preferably supported by an electromagnet 35. In this manner the operation of the reactor can be controlled by merely de-energizing the electromagnet 35 which will allow the sleeve 34 to fall to its bottom position thereby surrounding the critical region 14 and cutting off reflected neutrons.

*Critical region and fuels*

Various liquid fuels such as, for example, solutions or slurries, may be used in the reactor of the present invention. These include, but are not limited to, enriched uranyl nitrate or uranyl sulphate in ordinary or heavy water, as well as liquid fuels including plutonium as the fissionable material. Only one specific example will be given, although no limitation is thereby intended.

A solution of enriched uranyl sulfate ($UO_2SO_4$) in ordinary water having, for example, of the order of 0.5 molar solution, is the preferred fuel concentration for the reactor of the present invention. This type of liquid fuel has been used in homogeneous reactors in the past and many of its characteristics are known. (See "An enriched homogeneous nuclear reactor," Review of Scientific Instruments, volume 22, No. 7, pages 489–499, July 1951, and AECD–3287, Technical Information Service, Oak Ridge, Tennessee, 1952.)

The fissionable component of the preferred fuel is uranium enriched in the isotope $U^{235}$ to a value of about 90 percent. The reflector material may be of a material well known in the art as a neutron reflector, such as graphite.

The configuration of the critical region is as a close approximation one-half cylindrical and one-half spherical. Thus the critical size is determined by extrapolating between the critical size for a sphere and the critical size for a cylinder. Each of these calculations, as well as the extrapolation are well known in the art. Such calculations are performed in accordance with the generally accepted theory as described in Glasstone and Edlund, "The Elements of Nuclear Reactor Theory," chapter VIII (Van Nostrand Co., 1952).

By this analysis the approximate quantities and proportions for the preferred liquid fuel are as follows:

Uranium _____ 90 percent $U^{235}$
Critical mass _____ 900 gm. $U^{235}$
Operating mass ___ 2 Kg. $U^{235}$
Dimensions of
  critical region__ One-half spherical with 25 cm. diameter plus a cylinder 25 cm. diameter and 12 cm. high
Moderator _____ Normal water 15 liters
Reflector _____ Graphite (60 inch cube)

Utilizing this fuel solution the power output would approximate 100 kw. with a maximum thermal flux of the order of $10^{12}$ neutron/sq. cm./sec. based upon approximately 7 kw./liter of solution.

Should heavy water be utilized as the moderator, the dimensions of the critical region would have to be increased accordingly, and this would about double the thermal neutron flux at a given power lever. This would necessitate a decrease in the quantity of $U^{235}$ required to maintain a particular power output. It should be noted that the term "water" as used herein, unless otherwise specifically indicated, includes both normal water and heavy water, and that enrichments of $U^{235}$ other than 90 percent are specifically contemplated.

Further, liquid materials other than water, for example, slurries, and low boiling point fused salts and organic liquids, such as, $UF_6$, are specifically contemplated. The term fissionable material, as used herein, means material which readily undergoes fission when bombarded by thermal neutrons, i. e., $U^{233}$, $U^{235}$, or $Pu^{239}$. It should also be noted that the quantities and proportions pointed out above are only approximate, and that the calculation of the exact values depends upon the flux desired, the desired operating power level, the size of the reactor, the amount of effective poisoning components in the solution, and the moderator and reflector utilized. Thus, it is apparent that the exact physical meaning of "critical region" will depend upon a number of variable factors. However, in any case this term necessarily implies a fuel-moderator concentration in a critical geometry sufficient to sustain a fission chain reaction, i. e., the effective neutron multiplication factor is at least unity. In the specific embodiment being described the entire region 14 within the vessel 11 is the critical region, since the reaction shell 17 merely functions as a flow directing baffle having negligible neutronic thickness.

START-UP OPERATION

In starting up the reactor of the present invention the sleeve 34 is raised to about the half-way position to allow a portion of the neutrons reflected back to enter the critical region.

The vessel 11 is then evacuated through pipe 36 by a standard vacuum system not shown. The reactor of the present invention is preferably operated with practically all air removed. Although this is not essential to operability, it has certain advantages, such as, the over-all internal pressure during operation will be reduced, the efficiency of the condensing surfaces will be increased, and the high water vapor content will decrease the possibility of explosions of the oxygen-hydrogen mixtures resulting from the radiolytic decomposition of the water moderator.

The liquid fuel is then introduced through inlet pipe 30. As the fuel solution is introduced, various tests and calibrations are made in accordance with standard procedures. After the level of the fuel has been raised to the normal operating level 29, i. e., just below the top of the tube bundle 20, the input of fuel is stopped.

As the sleeve 34 is raised further, the neutrons reflected back into the critical region by the reflector will cause the fissionable fuel to become at least critical, i. e., the effective neutron multiplication will be at least one. Thus, the liquid fuel will heat, since the fission process will create heat. As the reactor begins to heat, the fissionable liquid fuel will expand, so that its reactivity is reduced. The effect is to maintain such a temperature that the multiplication rate is always very nearly one. The fissionable fuel concentration should be adjusted so that the fully withdrawn position of the sleeve 34 represents the desired maximum operating temperature, such as, for example, 100° C.

Water is then introduced into heat exchanger 22 and the cooling jacket. The effect of the water in the heat exchanger is to increase the power output, since the reactivity will be maintained at the same value. Thus, it can be seen that the power level of the reactor is controlled by the amount of heat removed through the heat exchanger, i. e., the rate of water flow which may be varied. The water in the heater exchanger is preferably ordinary filtered city water (not refrigerated) and preferably flows through coolant inlet and outlet pipes 26 and 27 under ordinary city water pressure. The induced radioactivity in the water, if it is of sufficient purity, will be negligible and the water may be discarded after a few minutes delay.

FUEL CIRCULATION

The heat which is created in the critical region 14 will heat the moderator to a temperature in excess of 100° C. thereby forming steam bubbles within the reaction shell 17. The radiolytic dissociation of the water moderator within the reaction shell will also form microscopic bubbles which will move upwardly because of their buoyancy. The upward movement of these bubbles, see Figure 3, into the tubes 20 will result in the forcing of liquid fuel out of the top of these tubes. Therefore, as the liquid fuel heats, a current is created by virtue of the rising bubbles which will also be aided by the natural convection circulation. In this manner the liquid fuel will circulate from the reaction shell 17 up the tubes 20 down through the heat exchanger 22, where it is cooled, through channel 19 and back into the reaction shell through apertures 18 where it will again be heated by the critical reaction taking place.

This arrangement results in a rapid circulation of the liquid fuel and dispenses with the complications of mechanical circulating systems. Furthermore, the reactor power level will be unperturbed by the ripples or the geyser effect taking place on the liquid fuel surface, since the critical region is located in a relatively remote place with respect to the surface perturbations. The bubbles formed within the liquid fuel will be swept from the reaction shell by the circulation before there has been sufficient time to appreciably affect the reactivity. This can be seen by considering the fact that a complete circulation cycle will take of the order of 5 seconds.

Thus the complicated control rod mechanisms, which are required in prior art devices in order to maintain accurate control of the neutron level, are not required in the present invention.

The bubbles, both steam and gas, rising through the tubes 20 push the liquid fuel upwardly and eject it out of the top of the tube where it falls back toward the outside. This geyser action is random, so that not all of the tubes are functioning to circulate the fuel at the same time. The tubes at the center of the tube bundle will function at the greatest rate, since a large part of the bubbles in the liquid fuel in the reaction shell are formed near the center where the temperature is the highest. Thus the efficiency of the fuel circulation at the center of the reaction region is higher than at the outside where the temperatures are comparatively lower. In this manner the hottest portion of the liquid fuel is the portion which is circulated the fastest, since bubble formation is dependent upon the temperature.

The bubbles formed at the center rise upwardly forcing the fuel in the central tubes out the top. The velocity of the fuel in the tubes 20 is considerably greater than the velocity at any other point in the system. Thus, this higher velocity aids in geyser effect. Obviously, this action is taking place in each of the tubes. Thus, it can be seen that the number of tubes, i. e., the total area of the tubes with respect to the cross sectional area of reaction shell, are interrelated. It has been found that if the total area of the tube bundle is from about one-third to about one-half of the cross sectional area of the reaction shell excellent efficiency results. However, it should be noted that this relationship is not a requirement, since it is within the purview of this invention to utlize a cylindrical reaction shell having a diameter equal to the diameter of the tube bundle.

The circulating fuel forced out of the top of the tubes 20 may be directed outwardly by a lip (not shown) on the top of each tube. In this manner the fuel may be moved into the heat exchanger region 22 where it will be cooled and circulated downwardly into channel 19.

The fuel in channel 19 constitutes a portion of the critical mass since the neutrons from the surrounding reflector, as well as from the liquid fuel within the critical shell, will cause fision to take place. Thus, as the fuel moves downwardly in channel 19, the heating process has already begun, and upon passage through aperture 18 enters the hot leg of the circulation cycle.

The reactor of the present invention may be operated at a large range of temperatures, examples of which are shown in the chart below.

*Chart*

| Temperature | 100° C. | 180° C. | 343° C. |
|---|---|---|---|
| Liters of steam per liter of soup per second at 300 kw cm | 12.4 | 1.44 | 0.20 |
| Tube length cm | 25 | 25 | 25 |
| Tube diameter cm | .8 to 1.5 | .7 to 1.4 | .6 to 1.2 |

It is apparent from this chart that the efficiency of the circulation is dependent upon the operating temperature, since the volume of steam produced is reduced with increasing temperature and this volume controls bubble formation. Further, since at the higher operating temperatures the pressure within the vessel is higher, the size of the bubbles will vary with operating temperature. Thus, after selecting the operating temperature, the tube diameter and length are determined. For a reactor power level of 300 kw. and a critical region of 25 cm. height, it is apparent from the chart that an increase in operating temperature results in the necessity for a smaller diameter tube in order to maintain the same relative circulation rate.

GAS CIRCULATION

The gases liberated by the radiolytic dissociation of the water moderator and the moderator vapor move into the area immediately above the solution surface. Baffles 28 function to prevent any liquid fuel from splashing or otherwise reaching the recombiner apparatus. The dissociated gases and vapor flow into the chimney 31 where they pass over a catalyst. The catalyst functions to recombine the hydrogen and oxygen gases to form water. During this recombination, heat is liberated, whereby the gases are caused to flow up the chimney 31. The recombined gases and vapor flow over the top of chimney 31 into the cooling and condensing channel. The cooling action of the water jacket and the inlet pipes condense the water vapor which is directed back into the fuel solution by baffles. Non-condensed gases pass into the hot leg and continue about the convention circuit.

The recombiner unit operation is more specifically described in the above referenced co-pending application Ser. No. 493,579. By this method the dissociated moderator gases are circulated over the recombining catalyst and are condensed without the use of circulating machinery. Furthermore, this arrangement makes it possible to place the recombining unit within the same vessel as the critical region thereby dispensing with burdensome and hazardous handling of explosive radioactive gases. The fact that the recombination takes place proximate to the liquid fuel means that the shielding of the reactor also functions as a shield for the gas recombiner. This arrangement and association of components is more fully described in co-pending application Ser. No. 500,710, filed April 11, 1955 by R. P. Hammond and Harold M. Busey, entitled Homogeneous Nuclear Reactor, the disclosure of which is incorporated herein by reference.

CONTROL

The temperature of the liquid fuel can be accurately controlled by the proper positioning of the sleeve 34 or the adjustment of the fissionable material content of the liquid fuel. The available reactivity may also be controlled by using a control rod, not shown, if desired. However, the utilization of a control rod will increase the fuel requirements, and is not required. The negative temperature coefficient of reactivity plus the absence of perturbations within the critical region will result in good neutron flux stability.

Another method of controlling the reactivity of the preferred embodiment of the present invention is by the addition or removal of water from the solution. This can be accomplished by apparatus well known in the art. See co-pending application Ser. No. 500,710 referred to above.

One embodiment of the present invention which is specifically contemplated is one in which there is no recombination of gases within the reactor vessel. In this embodiment the heat exchanger is located within the same pressure vessel as the critical reaction region, but is not within the critical geometry, i. e., in the same manner as the preferred embodiment, and a plurality of tubes 20 are utilized. However, the gas recombining apparatus or gas venting apparatus would be in accordance with the teachings of the prior art, i. e., located external to the reactor vessel. Such an embodiment is shown in Figure 4 of the attached drawings wherein the parts designated are the same as described hereinbefore except that a gas outlet 36 is provided in this embodiment so that the radiolytically decomposed moderator gas can be directed away from the reactor to a stack or conventional recombining apparatus, while the steam is condensed and returned to the reactor.

The circulation of the liquid fuel by the method and apparatus of the present invention is superior to prior art systems, since the operating temperature is higher, the circulation rate is materially increased, reactivity variations are reduced, no moving parts are required within the reactor vessel, all components are relatively simple in design thereby facilitating maintenance and replacement, and the inherent safety features of the homogeneous reactor, i. e., negative temperature coefficient of reactivity and ease of control, are utilized.

Thus, it is apparent that the preferred embodiment of the present invention provides a system in which the rate at which the fuel is circulated is dependent upon the operating temperature. In this manner there is complete power control of the nuclear reactor. This can be seen by considering that the rate at which the heat is removed by the heat exchanging system will control the power level of the reactor.

Further, it can be seen that the reactor of the present invention has a reduced critical region dimension, since the heat exchanger has been removed from this region thereby eliminating nutron absorption in this area by the heat exchanger. This location also reduces the radioactivity of the coolant, because the coolant is not located in the highest flux region. As a result, the coolant requires less safety precautions because of the lower induced radioactivity and the resulting shorter decay period to tolerable levels.

It is also apparent that the reactor of the present invention may be easily removed from its operating location, since all connections are made at the top of the vessel, thereby facilitating disconnection. Furthermore, all internal components are suspended from the top plate assembly so that removal for replacement or repair may be easily accomplished.

The preferred embodiment of the present invention utilizing a liquid fuel of uranyl sulfate and normal water does not require extensive corrosion protection of the reactor vessel or component parts. However, such corrosion protection in the form of gold, silver, platinum or similar material may be required for fuels other than the preferred liquid fuel.

It is, therefore, apparent that the present invention provides a novel arrangement and association of parts which results in a nuclear reactor having a simple yet efficient circulating system. While presently preferred embodiments of the invention have been described, it is clear that many other modifications may be made without departing from the scope of the invention. Therefore, the present invention is not limited by the foregoing description, but solely by the appended claims.

What is claimed is:

1. A homogeneous nuclear reactor comprising a vessel containing in combination a volume of liquid nuclear fuel including a fissionable material and a liquid moderator, means for attaining nuclear criticality in a region of criticality in said liquid fuel, and means including a plurality of small diameter vertically disposed tubes extending upwardly from said region of criticality to provide circulation of said liquid fuel from said region of criticality, said tubes producing a geyser effect for forcing liquid fuel out the top of said tubes when said liquid fuel is heated, said volume of liquid fuel having a level below the upper extremity of said tubes and above said critical region, and a channel for returning liquid fuel from the top of said tubes to said region of criticality.

2. A homogeneous nuclear reactor comprising a vessel containing in combination a volume of liquid nuclear fuel including a fissionable material and a liquid moderator, means for attaining nuclear criticality in a region of criticality in said liquid fuel, and means including a plurality of small diameter vertically disposed tubes extending upwardly from said region of criticality to provide circulation of said liquid fuel from said region of criticality, said tubes having a length about equal to the height of said region of criticality and producing a geyser effect for forcing liquid fuel out the top of said tubes when said liquid fuel is heated, said volume of liquid fuel having a level below the upper extremity of said tubes and above said critical region, and a channel for returning liquid fuel from the top of said tubes to said region of criticality.

3. A homogeneous nuclear reactor comprising a vessel containing in combination a volume of liquid nuclear fuel including a fissionable material and a liquid moderator, means for attaining nuclear criticality in a region of criticality in said liquid fuel, and means including a plurality of small diameter vertically disposed tubes extending upwardly from said region of criticality to provide circulation of said liquid fuel from said region of criticality, said small diameter tubes having a length about equal to the height of said region of criticality, said tubes having a diameter the same order of magnitude as the diameter of the bubbles, formed during the heating of the liquid fuel in said region of criticality, upon reaching the upper portion of said tubes, said tubes producing a geyser effect for forcing liquid fuel out of the top of said tubes when said liquid fuel is heated, said liquid fuel having a level below the upper extremity of said tubes and above said critical region, and a channel for returning liquid fuel from the top of said tubes to said region of criticality.

4. A homogeneous nuclear reactor comprising a vessel containing in combination a volume of liquid nuclear fuel including a fissionable material and a liquid moderator, means for attaining nuclear criticality in a region of criticality in said liquid fuel, and means including a plurality of small diameter vertically disposed tubes to provide circulation of said liquid fuel in said region of criticality from said region of criticality, said tubes extending upwardly from a flow directing baffle located in said region of criticality, said tubes being located above said region of criticality, said tubes and said baffle being spaced from the walls of said vessel thereby forming a channel for returning the liquid fuel from the top of said tubes, said tubes producing a geyser effect for forcing liquid fuel out the top of said tubes when said liquid is heated, said volume of liquid fuel having a level below the upper extremity of said tubes and above said critical region.

5. A homogeneous nuclear reactor comprising a vessel containing in combination a volume of liquid nuclear fuel including a fissionable material and a liquid moderator, means for attaining nuclear criticality in a region of criticality in said liquid fuel, and means including a plurality of small diameter vertically disposed tubes to provide circulation of said liquid fuel in said region of criticality from said region of criticality, said tubes extending upwardly from a flow directing baffle located in said region of criticality, said tubes being located above said region of criticality, said tubes and said baffle being spaced from the walls of said vessel, thereby forming a channel for returning the liquid fuel from the top of said tubes to said regions of criticality, said tubes producing a geyser effect for forcing liquid fuel out the top of said tubes when said liquid is heated, said volume of liquid fuel having a level below the upper extremity of said tubes and above said critical region, heat exchanger means located in said channel, said plurality tubes having a length about equal to the height of said region of criticality and a diameter of the same order of magnitude as the diameter of the bubbles, formed during the heating of the liquid fuel in said region of criticality, upon reaching the upper portion of said tubes.

References Cited in the file of this patent

Proceedings of the International Conference on the Peaceful Uses of Atomic Energy, United Nations: King, vol. 2 (1956), pp. 377, 387 and 391; Iskenderian et al., vol. 3 (1955), pp. 163–4; Harrer et al., vol. 3 (1955), pp. 251–2.